United States Patent [19]
Ackley

[11] 3,915,681
[45] Oct. 28, 1975

[54] FIBER GLASS ATTENUATOR TRAVERSING SYSTEM
[75] Inventor: Richard H. Ackley, Oakmont, Pa.
[73] Assignee: PPG Industries, Inc., Pittsburgh, Pa.
[22] Filed: Apr. 8, 1974
[21] Appl. No.: 458,946

[52] U.S. Cl............... 65/9; 65/11 R; 193/35 A
[51] Int. Cl.²................ C03B 37/02; B65G 13/00
[58] Field of Search.......... 193/35 A, 35 MD; 65/9, 65/11 R, 1

[56] References Cited
UNITED STATES PATENTS
2,518,744  8/1950  Barnard .................................. 65/1
2,928,121  3/1960  Plumbo .......................... 65/11 R X
3,796,184  3/1974  Hawkins .......................... 118/323

Primary Examiner—Robert L. Lindsay, Jr.
Attorney, Agent, or Firm—John E. Curley; Robert DeMajistre

[57] ABSTRACT

An apparatus for reciprocating a movable device comprises a continuous traveling track having an extended member or pin engaging a horizontal slot in the carriage of the movable device. At the terminal position of each reciprocation stroke, a shock absorber is positioned. The shock absorber provides the decelerating force or the decelerating and accelerating forces associated with the direction reversal of the movable device. Preferably, the movable device is a glass fiber attenuator.

10 Claims, 4 Drawing Figures

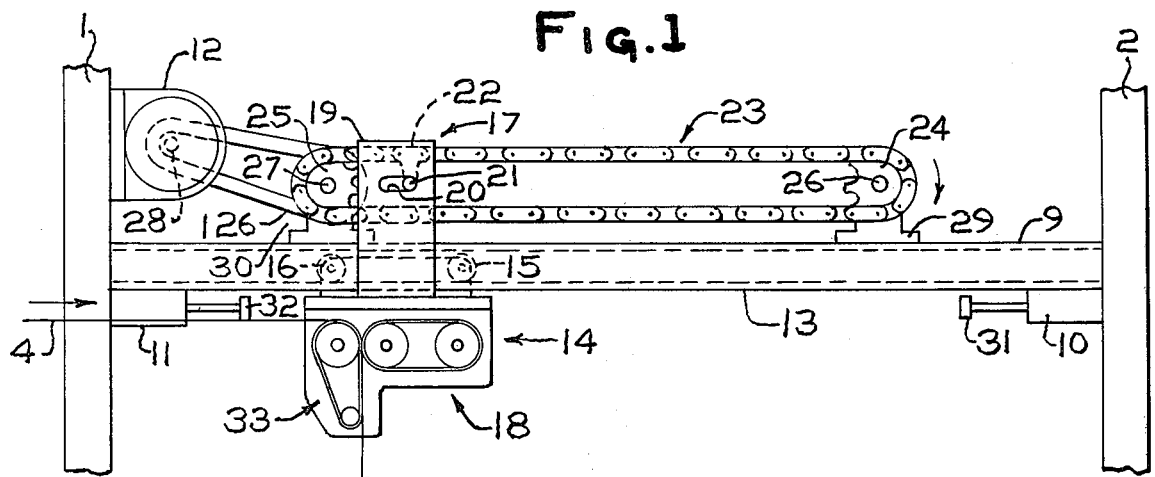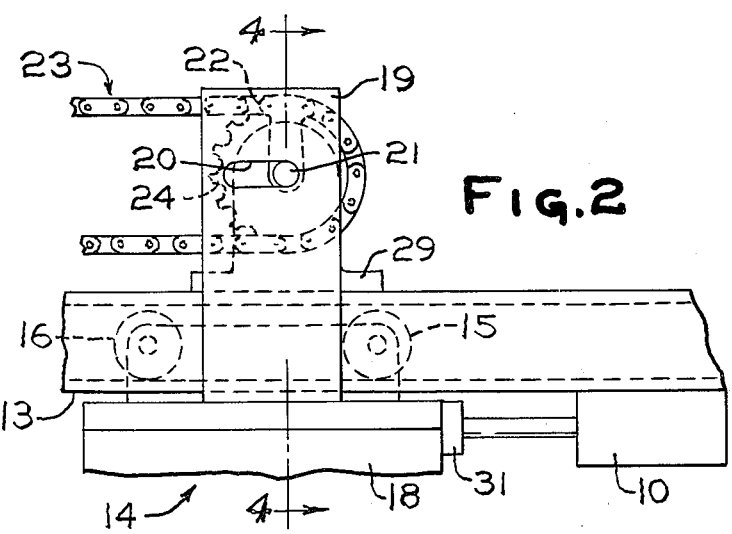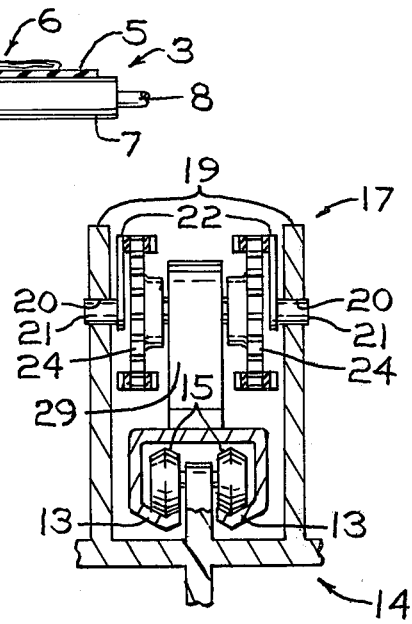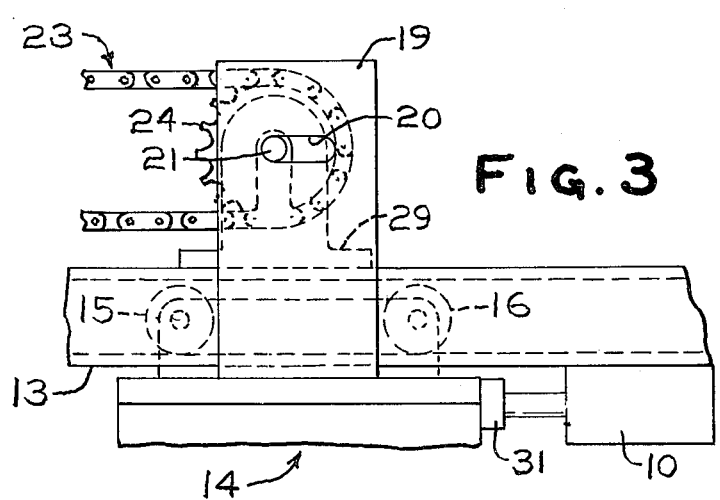

FIBER GLASS ATTENUATOR TRAVERSING SYSTEM

BACKGROUND OF THE INVENTION

This invention relates to reciprocating devices and more particularly to reciprocating glass fiber attenuators provided with means for reducing the shock incident to the reversal of the direction of travel of the reciprocating apparatus.

Continuous glass fibers are formed by the attenuation of molten cones of glass from tips or orifices in a glass fiber forming bushing such as shown in U.S. Pat. No. 2,133,238. The drawing force is supplied by either a rotating drum or a belt attenuator which has two flexible continuous opposing surfaces which grip the glass and project it onto the desired surface.

The glass fibers or filaments are passed over a roller applicator during formation which applies a sizing composition to the glass fibers. The sizing composition imparts lubricity to the single filaments. Further, the sizing composition usually contains a binder which provides integrity to the strand which is subsequently formed by the gathering of the individual filaments. The chemical characteristics of the sizing composition is such as to be compatible with the final use of the glass fibers.

The gathering of the fibers into strand is usually accomplished by passing the filaments over a gathering shoe which is typically a graphite cylinder having a plurality of grooves therein equal to the number of strands to be formed.

Glass fibers in the form of mat have found particular utility in the area of the reinforcement of resin matrices. Glass fiber mat can be formed by the attenuation of glass fibers through a belt attenuator which projects the fibers onto an accumulation surface. In one method of forming a continuous glass fiber mat, an attenuator continuously traverses the accumulation surface, which is a conveyor moving at an angle perpendicular to the path of the traverse. The attenuator projects the glass fibers onto the conveyor surface, thus forming a glass fiber mat.

Due to the weight and constant motion of this attenuator, and the reciprocation thereof, a great deal of stress is placed on the traversing mechanism which causes vibration and subsequent failure of the mechanical components of the traversing system; thus causing the interruption of the mat forming process and losses in production time due to repairs. Several methods of traversing an attenuator have been utilized in the glass fiber forming art. Exemplary of these methods is the mounting of the attenuator on a track and traversing the attenuator along the track by means of a reversing motor. The accelerative and decelerative forces associated with the reversal of the attenuator places a substantial amount of strain on the mechanical parts of the traversing system and the attenuator itself. Further, because of the abrupt motion of the attenuator, and pauses during the reversal, it has been found that the glass fibers accumulate at the terminal point of the reciprocating stroke thus forming a mat of substantially non-uniform density.

Another method which has been utilized for traversing an attenuator across a conveyor is by means of a driven chain having a pin fixedly attached to the chain. The pin engages a slot in the attenuator carriage. The slot is rectangular having the longer portion thereof perpendicular to the path of travel of the chain. The slot is of slightly larger diameter than the pin to allow slippage of the pin from the top portion of the slot to the bottom portion. As the pin pulls the attenuator through the traversing stroke, the pin is at the highest portion of the slot when the attenuator is traveling in one direction, and at the lower portion of the slot when the attenuator is traveling in the opposite direction, depending on whether the chain is moving clockwise or counterclockwise. At the end of a reciprocating stroke, the pin moves from the top portion of the slot to the bottom portion. Thus, the chain with the pin provides the accelerating, decelerating and velocity maintaining force for moving the attenuator. Due to the weight of the attenuator, jerking and vibration are encountered at the accelerating and decelerating points of traverse at the end of the stroke which causes excess fibers to be deposited on the collecting surface at the stroke's end. Also the vibration causes great strain on the mechanical parts of the traversing mechanism thus reducing the life of the pin, chain, and associated apparatus. Further, the slot in the attenuator carriage enlarges with use, thus necessitating the replacement of the carriage, pin and chain at frequent intervals.

The instant invention provides a method and apparatus for traversing the attenuator with minimal vibration and mechanical stress, thus providing for longer equipment life and further, a substantially uniform glass fiber mat. Additionally, the invention can be utilized in a plurality of environments such as the spraying of a continuous substrate or any other application which requires a movable device to be traversed across a distance.

DESCRIPTION OF THE INVENTION

An apparatus is provided for reducing the vibration normally associated with the reversal of direction of a reciprocating mass. The reciprocating mass may comprise a glass fiber attenuator such as previously described, a spraying device or a device for discharging powders or vapors, or it may comprise a cutting, scoring or severing device such as for cutting a continuous sheet, e.g., glass, paper, fabric or the like, or it may comprise an inspecting device such as a camera or an electrooptical device for detecting flaws in sheet material, or it may comprise a marking device such as a printing roll or it may comprise cleaning devices such as brushes or the like. In all the specific embodiments of this invention and in others which may be contemplated using the principles of this invention, it is of great importance to substantially reduce the vibration normally associated with the reversal of direction of the reciprocating, operating device.

In the preferred device, the glass fiber attenuator is traversed through a uniform distance while projecting a continuous flow of glass fibers therefrom. The traversing mechanism of the invention comprises a continuous traveling track such as a chain having affixed thereto an extended member or pin which engages a slot in the carriage of the movable device to be traversed. The extended member or pin is placed an equal distance from the juxtaposed portions of the traveling track. The extended member, while exerting a force on the attenuator carriage, is at a periphery of the slot. The slot is positioned so that its length is parallel to the direction of travel of the traveling track and has a length substantially greater than the pin size. Thus, when the carriage is traveling in one direction, the pin will be at the periphery of the slot on one end thereof and when the carriage is traveling in the opposite direction, the pin will be in contact with the periphery of the slot at the opposite end thereof.

When the carriage supporting the movable device approaches the termination point of a stroke during the traversing cycle, the movable device contacts a shock absorbing member which decelerates the movable device at a uniform rate of deceleration. The shock absorbing member contacts the movable device thus causing the extended member or pin to disengage from the periphery of the slot in the carriage. As the shock absorbing member travels in the direction of the inertial force of the movable device, the pin on the traveling track remains in a constant position, due to its travel around a return member. When the traveling track is a chain, the return member is a sprocket. At the utmost point of depression of the shock absorber, the opposite periphery of the slot contacts the pin and the movable device is traversed in the opposite direction. Thus, it can be seen that the length of depression of the shock absorber should be equal to the length of the slot in the carriage minus that portion of the length occupied by the pin.

The shock absorbing members can be completely elastic in order that all the accelerating and decelerating forces are provided therefrom. When completely elastic shock absorbing members are used, the slot length should be twice the length of travel of the shock absorbing member plus that portion of the length occupied by the pin. Thus, the pin will not contact the periphery of the slot until the movable device is at the velocity desired for traversing. The movable track with the engaged pin assembly will only provide the force necessary to maintain the velocity of the movable device at that velocity at which it contacted the shock absorbing member initially.

The movable device, along with the mounting carriage, is supported by a support apparatus which guides the movable device along its path of travel and relieves any supportive stress from the extended member or pin on the traveling track.

DESCRIPTION OF THE DRAWINGS

FIG. 1 is a front elevational view partially in section of the traversing mechanism having mounted thereon a glass fiber attenuator which is depositing glass fibers on an accumulating conveyor;

FIG. 2 is an enlarged view of the traversing mechanism of FIG. 1 while the carriage is engaging the shock absorbing member and the pin is disengaging the slot in the carriage;

FIG. 3 is a view of FIG. 1 with the pin engaging the slot in the carriage with the shock absorbing member completely depressed; the carriage being at rest and about to be moved along the return traversing stroke; and FIG. 4 is a cross-sectional view along the 4—4 line of FIG. 2 showing the chain and sprocket arrangement in the carriage and the supporting and guiding track along which the glass fiber attenuator assembly rides.

Turning now to FIG. 1, there is shown the traversing attenuation mechanism of the invention which is depositing glass fibers on a conveyor. Mounting members 1 and 2 support the traversing mechanism above the belt conveyor 3 on which the glass fiber strand 4 is deposited. The glass fiber strand 4 is being pulled from a bushing, not shown in the drawings, to the attenuator 33 which provides the drawing force for the fibers which have been gathered into strand 4. The fibers 4 are deposited on the belt 5 of the conveyor 3 perpendicular to the path of travel of the belt 5 of the conveyor 3. The glass fiber strand 4, so deposited, forms a mat 6 which may be used for the reinforcement of resinous material. The belt 5 is supported by the roll 7 which is driven by the shaft 8. The shaft 8 is driven by a motor (not shown) which provides constant uniform motion of the conveyor 3.

The mounting members 1 and 2 support the transom 9, the shock absorbing members 10 and 11, and the drive motor 12. The transom 9 has a pair of tracks 13 which support the traversing attenuator assembly 14. The traversing attenuator assembly 14 is supported and guided in the tracks 13 by two pairs of wheels 15 and 16 which ride in tracks 13. The pairs of wheels 15 and 16 are fixedly mounted to the traversing attenuator assembly 14.

The attenuator carriage 17 is fixedly attached to the attenuator housing 18. The attenuator carriage 17 has a pair of plates 19 having apertures or slots 20 therein which engage the extended members or pins 21. The pins 21 are attached to connecting links 22 which are integrally formed with the chains 23. The chains 23 are supported by two pairs of sprockets 24 and 25. Sprockets 24 are free wheeling about the shaft 26 and sprockets 25 are driven by a belt 126 engaging a pulley (not shown) which is mounted on the shaft 27. The belt 126 is attached to a second pulley 28 which is driven by the motor 12, thus providing the force necessary to drive the sprocket 25 and the traversing mechanism in FIG. 1 associated therewith.

The shafts 26 and 27 are mounted on foundation members 29 and 30 which are fixedly attached to transom 9. Shock absorbers 10 and 11 mounted on mounting members 1 and 2 are provided to contact the attenuator housing 18 by means of the plunger arms 31 and 32. Thus, the shock absorbers 10 and 11 absorb the shock of the traveling weight of the traversing attenuator assembly, including the attenuator 33, which is depositing glass fiber strand 4 on the conveyor belt 5.

Thus, it can be seen that as the sprockets 25 rotate, the chains 23 are moved along an axis. As the chains 23 move at a constant velocity, the pins 21 contact the periphery of the apertures 20 in plates 19 and drive the attenuator assembly 14 through the traversing distance. When approaching the end of a traversing stroke, the attenuator assembly 14 contacts the plunger 31 by means of the attenuator housing 18 and the traversing attenuator assembly 14 is brought to an instantaneous rest when the plunger 31 reaches its maximum depression. While the shock absorber 10 is absorbing the inertial force of the attenuator assembly 14, the pins 21 are in a stationary position while the chains 23 are rotating about the sprockets 24. When the pins 21 begin to travel along the return traversing stroke, they contact the juxtaposed periphery of apertures 20 in the plates 19 accelerating the traversing attenuator assembly 14, rapidly to the velocity of the attenuator assembly before acted upon by the shock absorber 10. On the return stroke, the same reversing process is encountered by the traversing mechanism.

Thus, the apparatus of the invention provides the uniform deposition of the glass fiber strand 4, into a uniform mat 6, supported by the belt 5, which is traveling in a direction perpendicular to the path of traverse of the attenuator assembly 14.

Referring now to FIG. 2 which shows an enlarged view of the shock absorbing section and the traversing assembly associated therewith of FIG. 1, with part broken away, at a time when the shock absorber 10 is engaged and the pins 21 are disengaged from the slots 20. When the plunger 31 contacts the attenuator housing 18, decelerative force is applied to the traversing attenuator assembly 14. The contact of the plunger 31 with the housing 18 is provided at a point during the traversing cycle when the velocity of the pins 21 is equal to zero. Thus, the connecting links 22 travel around the sprockets 24 while the pins 21 remain in a stationary position.

When the plunger 31 contacts the housing 18, the pins 21 are disengaged from the apertures 20 in the plates 19. Therefore, no force is being exerted on the pins 21 during the deceleration of the traversing attenuator assembly 14.

Referring now to FIG. 3, which shows the attenuator assembly 14 about to be sent on the return stroke. When the plunger 31 in the shock absorber 10 is at its maximum depression, the pins 21 contact the opposite end of the apertures 20 in the plates 19. Thus, both the velocity of the pins 21 and the velocity of the attenuator assembly 14 is equal to zero, thus no jerking or banging stress between the pins 21 and the periphery of the slots 20 is induced when reversing of the attenuator carriage is enacted. Instantaneously, after the engaging of the pins 21 with the periphery of the slots 20, the attenuator assembly 14 is accelerated to the previous velocity of the attenuator traversing assembly 14 before being contacted with the shock absorbing plunger 31 and thus the attenuator assembly 14, is sent on its return stroke. The same reversing process is encountered each time there is a stroke reversal.

Therefore, FIGS. 2 and 3 show that the length of the slots 20 should be equal to the distance of travel of the shock absorber plungers 31 and 32 plus the diameter of the pins 21 to have the maximum reduction of vibration in the traversing system. Alternatively, when it is desired to have the shock absorbers 10 and 11 provide both the accelerative and decelerative forces, a completely elastic shock absorber should be provided in which case the slot length should be equal to 2 times the distance of travel of the shock absorber plungers 31 and 32 plus the diameter of the pin members 21. Thus, the pin members 21 will contact the periphery of the slots 20 when the attenuator traversing assembly 14 has reached the desired velocity. Thus, the only strain to be encountered on the pins 21 is that associated with the provision of the maintaining force for providing a constant velocity to the traversing attenuator assembly 14.

FIG. 4 is a cross-sectional view along the 4—4 line of FIG. 2 showing the construction of the transom 9 with the attenuator carriage 17 mounted thereon. The plates 19 having the apertures or slots 20 are shown with the pins 21 inserted therein. The pins 21 have connecting links 22 mounted on the chain 23 (not seen in FIG. 4 due to the sectional view). The sprockets 24 are mounted on the shaft 26 which are mounted on foundation plate 29 which is fixedly attached to the transom 9. The wheels 15 ride along the tracks 13 in the transom 9 thus providing the guiding and supportive force for the traversing attenuator assembly 14 parts broken away in FIG. 4.

The description of FIGS. 1 through 4 elucidating the apparatus of the invention and the explanation of the operation of this apparatus is descriptive of a traversing mechanism having particular utility in the area of traversing a glass fiber attenuator across a conveyor to form a substantially uniform glass fiber mat. The traversing mechanism has minimal maintenance due to its smooth mechanical operation in the reduction of jerking and mechanical stress on the various parts of the traversing apparatus.

Although the invention has been described with reference to specific apparatus and component parts, the invention is only not to be limited in respect thereto, but only limited insofar as is set forth in the accompanying claims.

I claim:

1. An apparatus for reciprocating a movable device along an axis comprising:
    means for supporting and guiding said device along said axis;
    a continuous movable track, said movable track moving at a constant speed;
    means for supporting and providing motion to said movable track; an extended member fixedly mounted on said movable track, said extended member traveling parallel to said axis and in a single horizontal plane, said extended member reciprocating in accordance with the motion of said track;
    and
    a plate having therein an aperture, said plate being mounted on said movable device, the periphery of said aperture engaging said extended member to provide accelerative force to said movable device; said aperture being of sufficient size in relation to said extended member to provide disengagement of said extended member and said periphery of said aperture;
    and
    engageable means for applying decelerating forces to said device; said accelerating and decelerating force imparting reciprocating motion to said device along said axis.

2. The apparatus according to claim 1, wherein said supporting and guiding means comprises a transom defined by said axis, and wheels mounted on said movable device, said wheels riding on said transom.

3. An apparatus for reciprocating a movable device along an axis comprising:
    means for supporting and guiding said device along said axis;
    engageable means for applying accelerating and decelerating forces to said movable device;
    a continuous movable track, said movable track operating at a constant speed;
    means for supporting and providing motion to said movable track; an extended member fixedly mounted on said movable track, said extended member traveling along said axis and in a single horizontal plane, said extended member reciprocating in accordance with the motion of said track;
    and
    a plate having therein an aperture, said plate being mounted on said movable device, the periphery of said aperture engaging said extended member to provide constant velocity to said movable device; said aperture being of sufficient size in relation to said extended member to provide disengagement of said extended member and the periphery of said aperture.

4. The apparatus according to claim 1, wherein said engageable means for applying decelerative force comprises:
   a pair of shock absorbing members placed at the termination of each reciprocation stroke;
   a housing containing said movable device, said housing contacting one of said shock absorbing members at the termination of each reciprocation stroke, said shock absorbing members providing decelerative forces to said movable device, said shock absorbing members engaging said housing causing said extended member to disengage from said periphery of said aperture.

5. The apparatus of claim 1, wherein said movable device is a glass fiber attenuator.

6. An apparatus according to claim 3, wherein said supporting and guiding means is a transom defined by said axis and wheels mounted on said movable device, said wheels riding on said transom.

7. The apparatus according to claim 3, wherein said engagable means for applying accelerative and decelerative forces comprises:
   a pair of substantially perfectly elastic shock absorbing members placed at the termination of each reciprocation stroke;
   a housing containing said movable device, said housing contacting one of said shock absorbing members at the termination of each reciprocation stroke, said shock absorbers providing accelerative forces and decelerative forces to said movable device, said shock absorbers engaging said housing causing said extended member to disengage from said periphery of said aperture.

8. The apparatus of claim 3, wherein said movable device is a glass fiber attenuator.

9. An apparatus for reciprocating a movable device along an axis comprising:
   means for supporting and guiding said device along said axis;
   a continuous movable track, said movable track moving at a constant speed;
   means for supporting and providing motion to said movable track;
   an extended member fixedly mounted on said movable track, said extended member traveling parallel to said axis and in a horizontal plane, said extended member reciprocating in accordance with the motion of said track;
   a plate member having therein an aperture, said plate being mounted on said movable device, the periphery of said aperture engaging said extended member to provide accelerating force to said movable device;
   a pair of shock absorbing members placed at the termination of each reciprocation stroke, said shock absorbing members having depressable plungers; the length of the depression of said plungers being substantially equal to the length of said aperture measured along said axis minus the cross sectional length of said extended member;
   a housing supporting said movable device, said housing contacting one of said shock absorbing members at the termination of each reciprocation stroke, said shock absorbing members providing deceleration forces to said movable device, said shock absorbing members engaging said housing causing said extended member to disengage from the periphery of said aperture.

10. The apparatus of claim 9 wherein said movable device is a glass fiber attenuator.

* * * * *